United States Patent
Mendenhall et al.

(12)

(10) Patent No.: US 6,606,106 B1
(45) Date of Patent: Aug. 12, 2003

(54) HIERARCHICAL MODEL FOR EXPRESSING FOCUS TRAVERSAL

(75) Inventors: David P. Mendenhall, New York, NY (US); Hania Gajewska, Woodside, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 615 days.

(21) Appl. No.: 09/586,133

(22) Filed: Jun. 2, 2000

(51) Int. Cl.$^7$ .................................................. G06F 3/14

(52) U.S. Cl. ........................ 345/854; 345/767; 345/817; 345/172

(58) Field of Search ................................ 345/854, 767, 345/804, 783, 806, 853, 764, 810, 841, 835, 817, 819, 820, 821, 823, 822, 160, 168, 172; 348/734

(56) References Cited

U.S. PATENT DOCUMENTS

| | | | | |
|---|---|---|---|---|
| 5,625,763 A | * | 4/1997 | Cirne | 345/767 |
| 6,246,405 B1 | * | 6/2001 | Johnson | 345/764 |
| 6,249,284 B1 | * | 6/2001 | Bogdan | 345/764 |
| 6,388,686 B1 | * | 5/2002 | Hetherington et al. | 345/810 |

FOREIGN PATENT DOCUMENTS

EP 0 982 656 A1 3/2000 ............. G06F/9/44

OTHER PUBLICATIONS

Mark McCulley; "Focus on Swing, Explore Focus Management with JFC's Swing Components"; Java World, vol. 3, No.7; ISSN 1091–890, Jul. 1998, 5 pages.

"Technique to Move Focus in Presentation Manager Applications"; IBM Technical Disclosure Bulletin, vol. 34, No. 11, Apr. 1992, pp. 278–279.

PCT International Search Report, Dated Apr. 17, 2002, 7 pages.

* cited by examiner

Primary Examiner—Raymond J. Bayerl
(74) Attorney, Agent, or Firm—Rosenthal & Osha L.L.P.

(57) ABSTRACT

A method is described for establishing a focus traversal protocol in a graphical user interface having a plurality of components within at least one top-level window. The method includes defining the top-level window as a first focus cycle root, assigning a plurality of components to a first focus traversal cycle associated with the first focus cycle root, and for each component in the first focus traversal cycle, establishing a focus traversal key definition including a forward traversal key and a backward traversal key. The method further includes establishing a first focus traversal policy associated with the first focus traversal cycle. A windowing toolkit is also described for use by a developer in establishing a focus traversal protocol for a graphical user interface having a plurality of components within at least one top-level window. The method may also include defining one of the plurality of components of the first focus traversal cycle as a second focus cycle root, assigning a plurality of components to a second focus traversal cycle associated with the second focus cycle root, establishing a focus traversal key definition including a forward key traversal key and a backward key traversal key for each component in the second focus traversal cycle, and establishing a second focus traversal policy associated with the second focus traversal cycle. The windowing toolkit has a plurality of windowing tools each having codes suitable to be executed by a computer. The toolkit includes a first tool configured to assign a plurality of components to a first focus traversal cycle associated with a first focus cycle root, the first focus cycle root being defined as a top-level window, a second tool configured to assign a focus traversal key definition to each component in the first focus traversal cycle, the focus traversal key definition including a forward traversal key and a backward traversal key, and a third tool configured to establish a first focus traversal policy associated with the first focus traversal cycle.

30 Claims, 9 Drawing Sheets

*FIGURE 4*

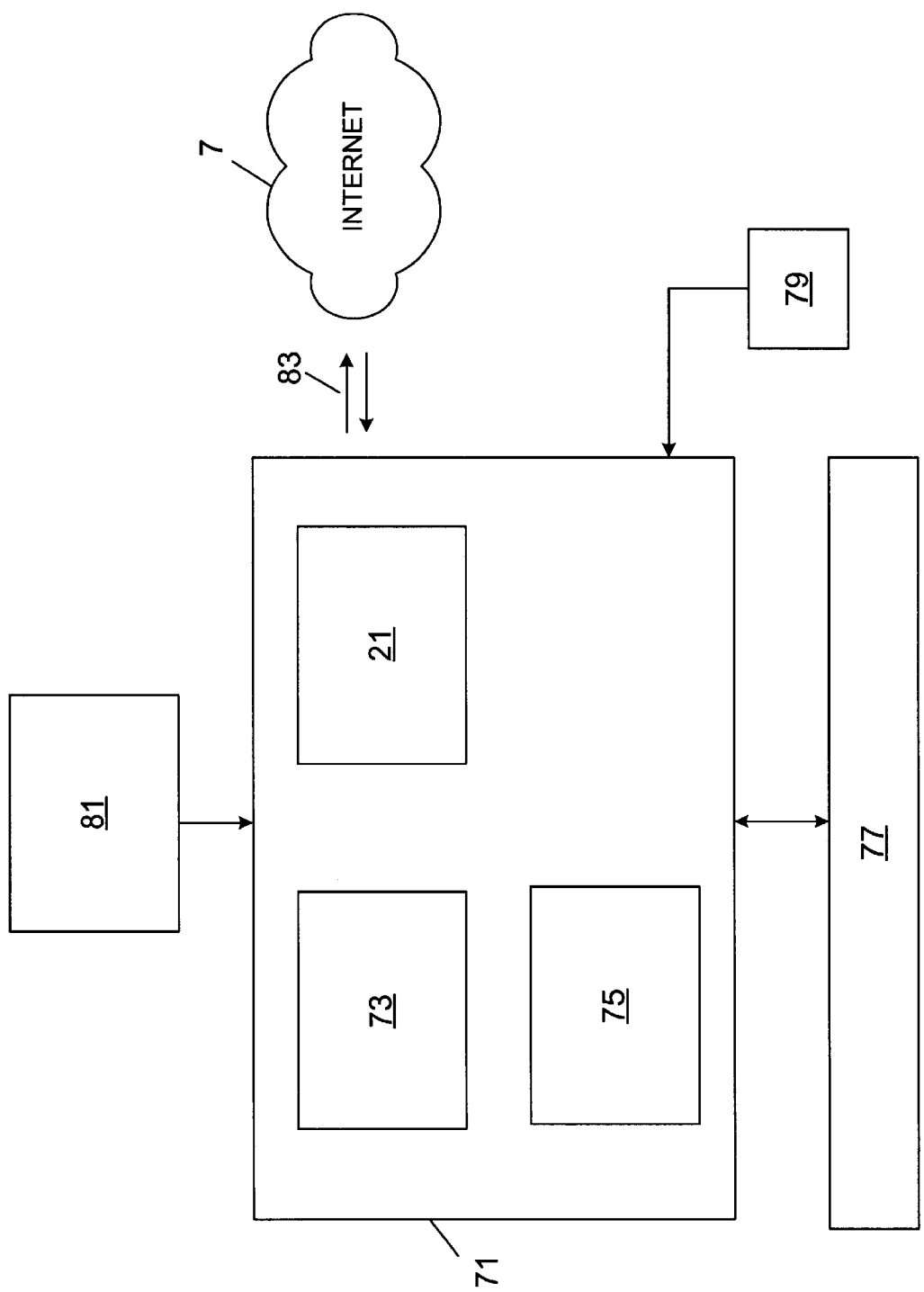

HIERARCHICAL MODEL FOR EXPRESSING FOCUS TRAVERSAL

BACKGROUND OF THE INVENTION

1. Technical Field

The invention relates to windowing toolkits for computers. More particularly, the invention relates to definition and manipulation of a focus owner within a focus traversal cycle.

2. Background Art

The basic functionality of a computer is dictated both by the hardware of the computer and by the type of operating system it uses. Various operating systems exist in the marketplace, including Solaris from Sun Microsystems, Mac OS from Apple Computer, the "Windows" operating systems, e.g., Windows 95/98 and Windows NT, from Microsoft, and Linux. A given combination of computer hardware, an operating system 1 and a windowing system will be referred to herein as a "platform". Prior to the popularity of the Internet, software developers wrote programs specifically designed for individual platforms. Thus, a program written for one platform could not be run on another. However, the advent of the Internet made cross-platform compatibility a necessity.

Prior art FIG. 1 illustrates a conceptional arrangement wherein a first computer 3 running the Solaris platform and a second computer 5 running the Windows 98 platform are connected to a server 9 via the Internet 7. A resource provider using the server 9 might be any type of business, governmental, or educational institution. The resource provider has a need to be able to provide its resources to both the user of the Solaris platform and the user of the Windows 98 platform, but does not have the luxury of being able to custom design its content for the individual platforms.

The Java™ programming language was developed by Sun Microsystems to address this problem. The Java™ programming language was designed to be simple for the programmer to use, yet able to run securely over a network and work on a wide range of platforms.

Referring to FIG. 2, in order to create a Java™ application, the developer first writes the application in human-readable Java™ source code. As used herein, the term "application" refers to both true Java™ applications and Java™ "applets" which are essentially small applications usually embedded in a web page. In the example shown, the application "Program" 11 is created as a human-readable text file. The name of this text file is given the required extension ".java".

A Java™ compiler such as Sun Microsystem's "javac" 13 is used to compile the source code into a machine-readable binary file 15. The text file will contain Java™ language commands, e.g., "import java.awt.Frame". A discussion of the Java™ language itself is beyond the scope of this document. However, complete information regarding the Java™ programming language is available from Sun Microsystems both in print and via the Internet. The resulting binary file 15 will automatically receive the same file name as the source text file, but will use ".class" as the trailing extension. The Java™ runtime environment incorporates a Java™ "virtual machine" (JVM) 16 to convert the ".class" byte codes into actual machine executions 17. The machine executions (like drawing windows, buttons, and user prompt fields) will occur in accordance to the application developer's code instructions. Because Sun Microsystems specifically designed the JVM to run on different platforms, a single set of ".class" byte codes will execute on any platform where a JVM has been installed. An Internet browser that incorporates a JVM, such as Netscape Navigator or Microsoft Internet Explorer, "Java™-enabled" browser.

The cross-platform architecture of the Java™ programming language is illustrated in FIG 3, which shows how the Java™ language enables cross-platform applications over the Internet. In the figure, the computer 3 running the Solaris platform and the computer 5 running the Windows 98 platform are each provided with a Java™ virtual machine 21. The resource provider creates a Java™ application using the Java™ software development kit ("SDK") 23 and makes the complied Java™ byte codes available on the server 9, which in this example is running on a Windows NT platform. The server 9 may, but need not, be provided with its own JVM 21. Through standard Internet protocols, both the computer 3 and the computer 5 may obtain a copy of the same byte codes and, despite the difference in platforms, execute the byte codes through their respective JVMs.

Figure 4:
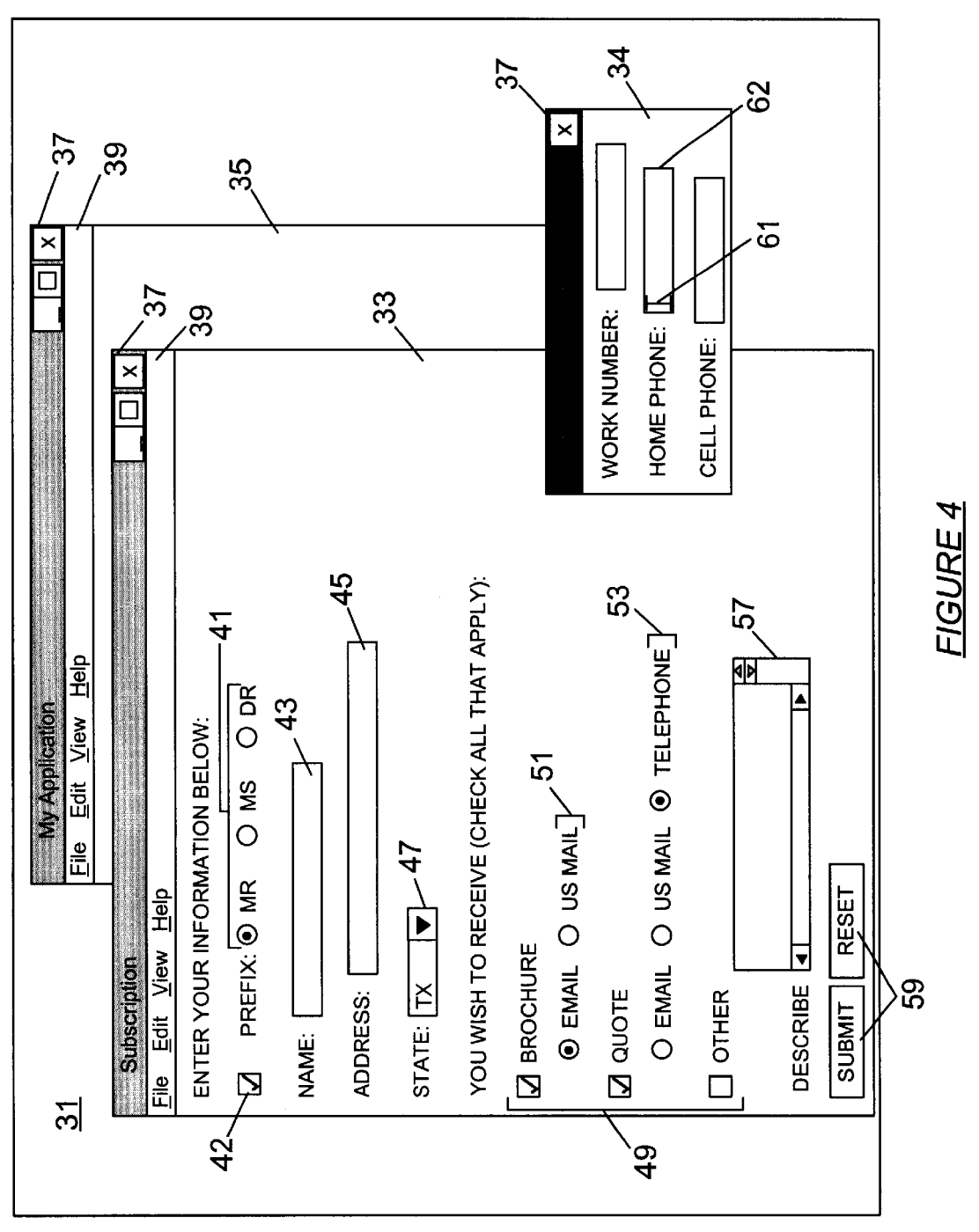

FIG. 4 illustrates an exemplary display on a screen 31 including top-level windows 33, 34, and 35. Each window includes a title bar 37 for displaying the title of the window and, if applicable, a menu bar 39 containing a number of pull down menu buttons defined by the developer. In this example, window 34 is the "active" window, as indicated by the darkened title bar. Windows 33 and 35 are inactive as indicated by the grayed out title bar. The window 33 includes a number of typical components, including "radio buttons" 41 which in this case allow the user to select a prefix when check box 42 is checked, a text field 43 for entering a name, and an address field 45 for entering an address. Component 47 is a "chooser" allowing the user to choose a state. Components 49 are check boxes that allow the user to check one or all of the options that apply. Associated with these check boxes are additional radio buttons 51 and 53 that allow the user to select a desired means of transmission. If the "quote" check box 49 is selected and the telephone radio button is selected, the window 34 appears allowing the user to enter telephone numbers. An additional text area 57 is associated with the "other" check box 49. Finally, "submit" and "reset" buttons 59 are provided to allow the user to either submit the form or reset it.

Generally speaking, there is a particular look to the components of the type described above depending upon the type of platform being used. Thus, check boxes on the Solaris platform would appear different from check boxes on the Windows 98 platform. One of the early innovations of the Java™ programming language was to allow cross-platform applicability while retaining the look and feel of the native platform on which the application was running. This was done by incorporating "heavyweight components", namely, incorporating components from the native platform into the Java™ application itself. This would ensure that a Java™ application running on a particular platform would have a look and feel that was consistent with what th user, of that platform would expect. The Java™ Abstract Windowing Toolkit or "AWT," is a library of such heavyweight components for use by application developers.

As the popularity of the Internet has increased, users have become accustomed to many different types of interfaces. Thus, aesthetic conformity within a particular native platform has become less of an issue. At the same time, functionality, and versatility have become increasingly important. Particularly, developers now desire the flexibility to customize the appearance of a particular site to a company's own look and feel. Therefore, the Java™ 2 Standard Edition SDK includes a new package for the developer called the Java™ Foundation Classes (also known as Swing). Swing is essentially a library of "lightweight components". Lightweight components are components that are not derived from a particular native platform. A primary motivation behind use of lightweight components is aesthetic conformity within a particular application. Swing components have "pluggable look and feel", meaning that the developer can use them with their default appearance or define a different appearance for a particular application.

This new package of lightweight components is simply one library that is possible; other libraries may be created and in fact are available from third parties. Swing provides the developer with the option and flexibility to use lightweight components to customize appearance in a given application. A detailed discussion of the Java™ AWT and the Swing package is beyond the scope of this document. Complete documentation is available from Sun Microsystems both in print and at the web site.

Another issue for consideration by the application developer is the concept of "focus". Traditionally, the "focus owner" is the component that, at a given time, receives keyboard input generated by the application user. The user, of course, has the ability to transfer focus between components. The primary method for changing focus is by clicking on a new component using a mouse. However, an alternate way of changing focus is by using the keyboard. Using the keyboard to change focus is referred to as "focus traversal". Typically, focus traversal is achieved using pre-defined keys on the keyboard (for example, the TAB key) or some equivalent device in an accessible environment. For example, referring again to FIG. 4, a cursor 61 (which would be blinking) is shown in the "home phone" text field 62. This means component 62 is the focus owner, and keyboard input generated by the user would be sent to that field. Typically, the user may then move to the next component ("cell phone") without using the mouse by simply hitting the TAB key, or return to the previous component ("work number") by hitting SHIFT-TAB. This is referred to as forward and backward focus traversal, respectively. In addition to user-initiated traversal, client code can also initiate traversal programmatically.

Existing programming toolkits, including the Java™ AWT, employ focus traversal to assist and expedite application development. The existing focus traversal model in Swing defines a "focus cycle" to be a set of components such that normal forward and backward focus traversal would be constrained to the components in the cycle. Each cycle defines a "focus cycle root", which is a component in the hierarchy that contains all of the components in the focus cycle. These focus cycle roots are useful for efficiently specifying focus cycles.

For example, the developer can define a focus cycle to be all focus-traversable descendants of a focus cycle root. Returning to the example of FIG. 4, the window 33 may be defined as a focus cycle root to all the focus-traversable descendents shown inside that window. In responding to the example questionnaire, the application user would then be able to traverse through the various data-gathering components. Specifically, the focus cycle as shown in FIG. 5 results. Thus, the developer is able to establish a policy, e.g., of using the TAB and SHIFT-TAB keys, by which the user is able to reach all focusable components in the window using focus traversal.

SUMMARY OF THE INVENTION

In one aspect, the invention provides a method of establishing a focus traversal protocol in a graphical user interface having a plurality of components within at least one top-level window. The method includes defining the top-level window as a first focus cycle root, assigning a plurality of components to a first focus traversal cycle associated with the first focus cycle root, and for each component in the first focus traversal cycle, establishing a focus traversal key definition including a forward traversal key and a backward traversal key. The method further includes establishing a first focus traversal policy associated with the first focus traversal cycle.

In some embodiments, the invention includes defining one of the plurality of components of the first focus traversal cycle as a second focus cycle root, assigning a plurality of components to a second focus traversal cycle associated with the second focus cycle root, and for each component in the second focus traversal cycle, establishing a focus traversal key definition including a forward traversal key and a backward traversal key. The method further includes establishing a second focus traversal policy associated with the second focus traversal cycle.

In another aspect, the invention provides a windowing toolkit for use by a developer in establishing a focus traversal protocol for a graphical user interface having a plurality of components within at least one top-level window, the windowing toolkit having a plurality of windowing tools each having codes suitable to be executed by a computer. The toolkit includes a first tool configured to assign a plurality of components to a first focus traversal cycle associated with a first focus cycle root, the first focus cycle root being defined as a top-level window, a second tool configured to assign a focus traversal key definition to each component in the first focus traversal cycle, the focus traversal key definition including a forward traversal key and a backward traversal key, and a third tool configured to establish a first focus traversal policy associated with the first focus traversal cycle.

In some embodiments, the first tool is further configured to define one of the plurality of components of the first focus traversal cycle as a second focus cycle root and to assign a plurality of components to a second focus traversal cycle associated with the second focus cycle root. The second tool is further configured to assign a focus traversal key definition to each component in the second focus traversal cycle, the focus traversal key definition including a forward traversal key and a backward traversal key, and the third tool is further configured to establish a second focus traversal policy associated with the second focus traversal cycle.

Other aspects and advantages of the invention will be apparent from the following description and the appended claims.

BRIEF DESCRIPTION OF THE DRAWINGS

FIG. 4 illustrates a typical graphical user interface (GUI).

FIG. 6 is a schematic diagram of a computer system.

DETAILED DESCRIPTION OF THE INVENTION

Figure 1:
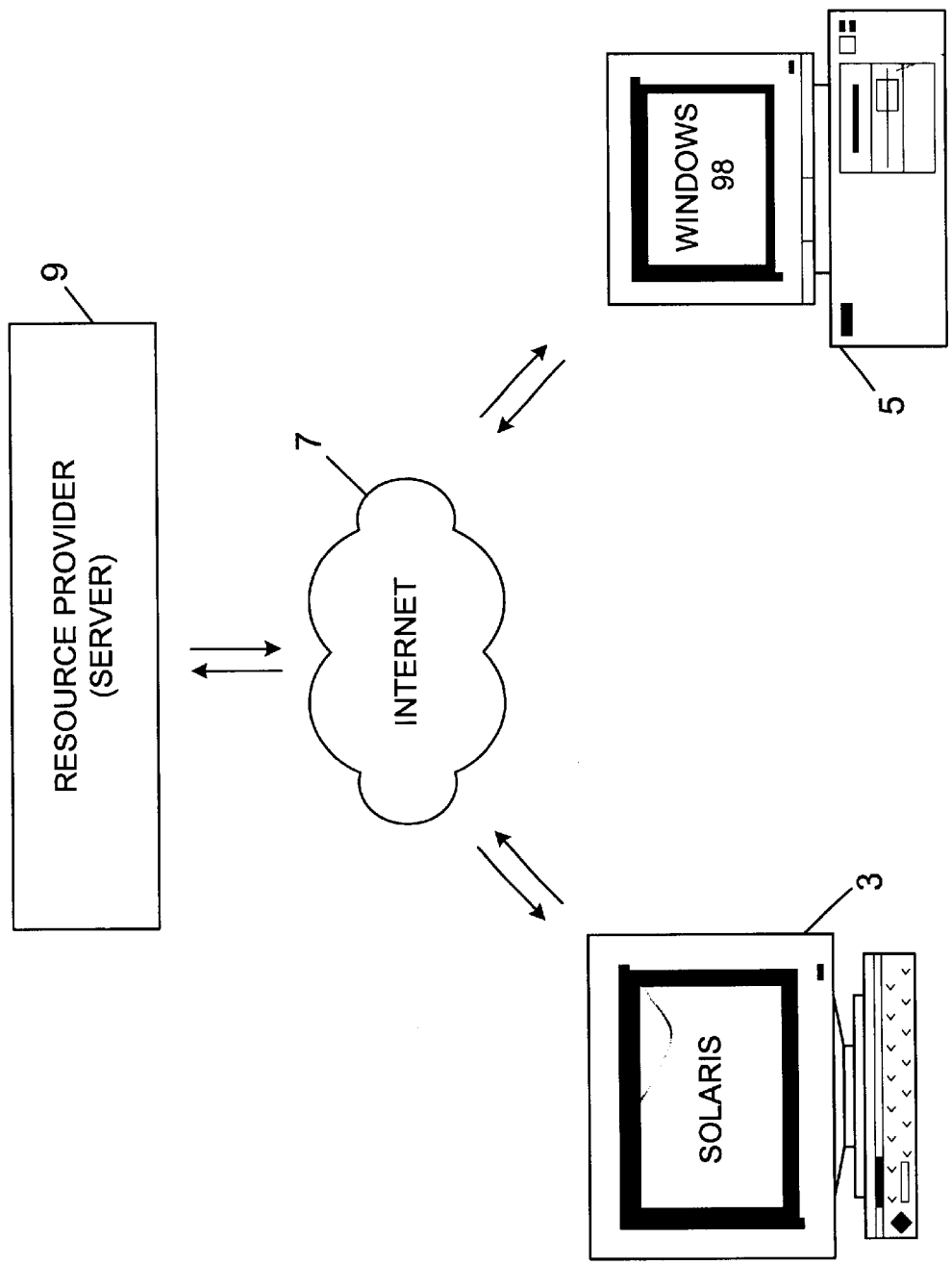
FIG. 1 illustrates a multiple platform environment.

Various embodiments of the invention will now be discussed with reference to the accompanying figures. Like elements in the figures are denoted by like reference numbers for convenience.

The invention described herein may be implemented on virtually any type of computer regardless of the platform being used. For example, as shown in FIG. 6, a typical computer 71 will have a processor 73, associated memory 75, and numerous other elements and functionalities typical to today's computers (not shown). The computer 71 will have associated therewith input means such as a keyboard 77 and a mouse 79, although in an accessible environment these input means may take other forms such as a special input device designed for a disabled user. The computer 71 will also be associated with an output device such as a display 81, which may also take a different form in an accessible environment. Computer 71 is connected via a connection means 83 to the Internet 7. The computer 71 is configured to run a Java™ virtual machine 21, implemented either in hardware or in software.

Figure 5:
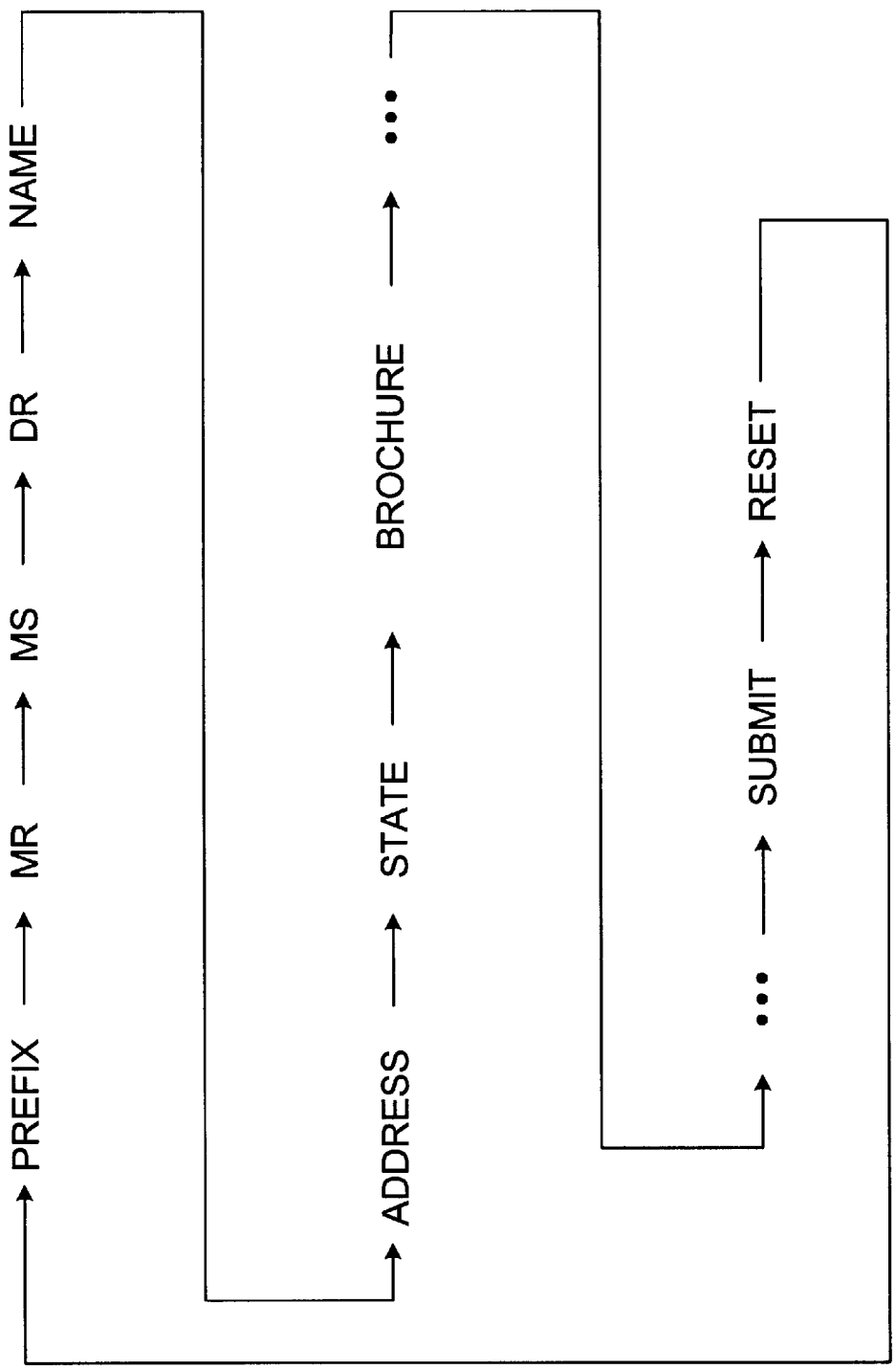
FIG. 5 illustrates a focus traversal cycle for the GUI of FIG. 4.
Figure 7A:
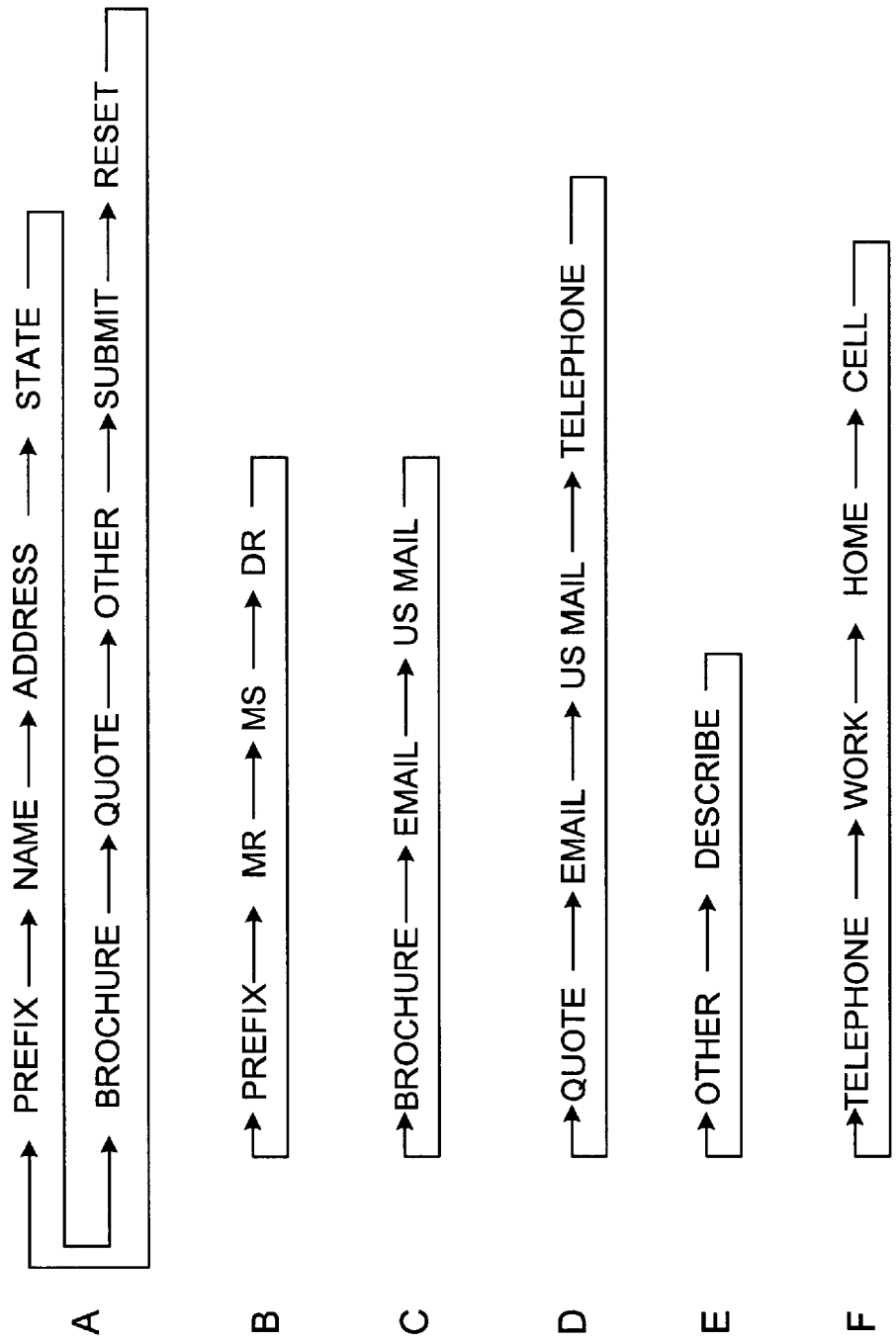
FIG. 7A illustrates a nested focus traversal cycle.
Figure 7B:
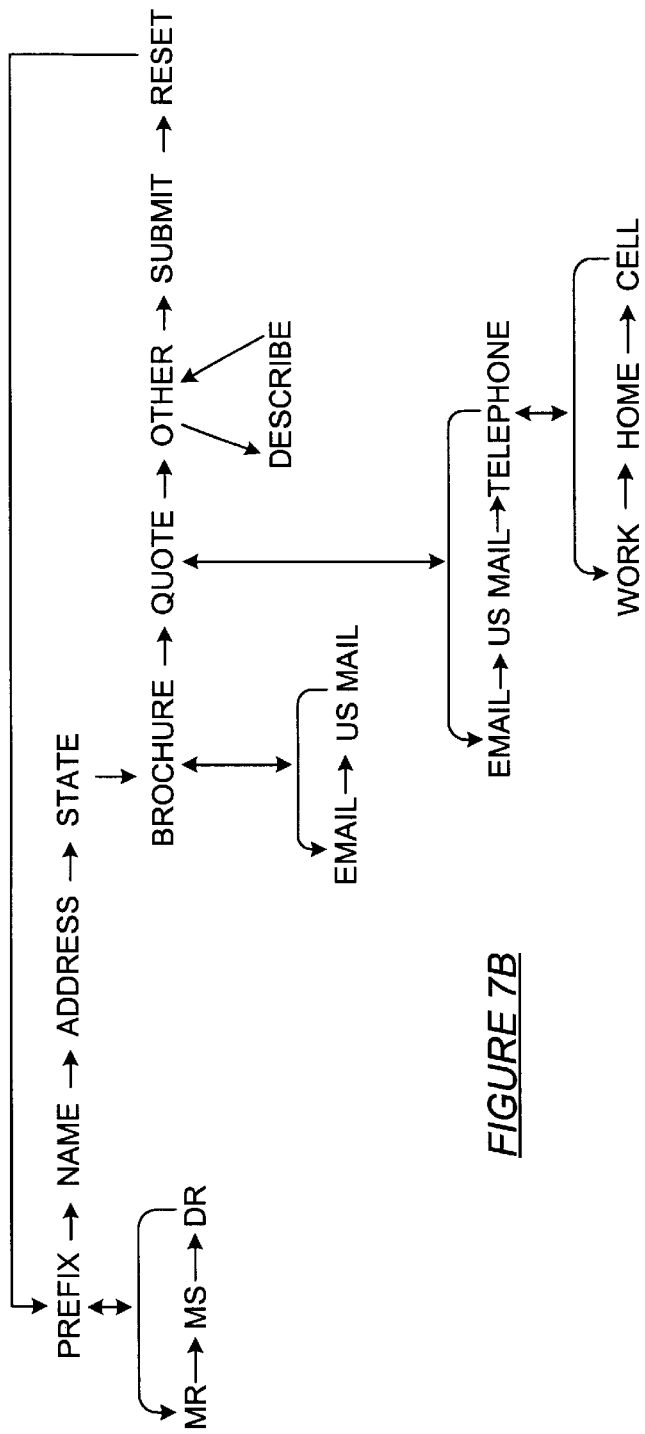
FIG. 7B illustrates a flow diagram for the nested focus traversal cycle of FIG. 7A.
Figure 7C:
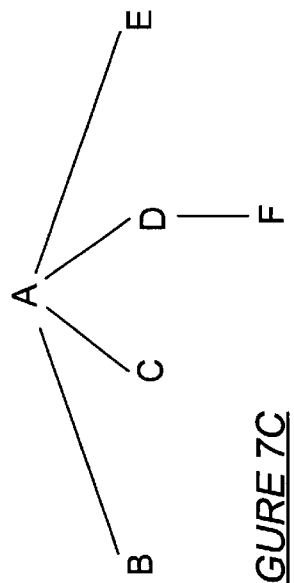
FIG. 7C illustrates a graphical representation of the nested focus traversal cycle of FIG. 7A.

Returning now to the focus traversal cycle example shown in FIG. 5, it would be desirable to provide a developer using a windowing toolkit with an elegant and structured approach to the definition of focus traversal. For example, an elegant and developer-friendly approach to this focus traversal example would be to define a plurality of "nested" focus traversal cycles as shown in FIG. 7A. By separating the descendants of the original window 33 and window 34 into six separate focus traversal cycles (letters A–F), the developer would more easily be able to provide the user with the ability to navigate the application. A flow diagram of the six focus traversal cycles is shown in FIG. 7B, and a summary graphical representation is shown in FIG. 7C. Although the existing focus traversal model in the Swing toolkit would allow definition of these individual focus cycles, the mechanism to do this is awkward and error-prone, and there is no way for the developer to define traversal into and out of focus cycles once they are entered. Thus, there exists a need for a sophisticated and complete model for expressing focus traversal.

In accordance with the above, various aspects of the invention achieve one or more of the following advantages. The spirit of Swing's "focus cycle" concept is maintained in that there may exist containers which constrain focus to themselves and their descendants. This is particularly useful to the developer for designing user interfaces that include, for example, groups of related buttons. In addition, each focus cycle root precisely defines how focus traversal occurs forward and backward among its descendants. Also, different focus cycle roots are able to define different traversal behaviors for their descendants. Furthermore, once focus enters a particular focus cycle, a mechanism is defined for traversing back out of the focus cycle or into a new focus cycle using the keyboard or an equivalent input device.

In accordance with embodiments of the invention, a hierarchical model has been defined for expressing focus traversal. This hierarchical model divides the focusable components in an application into a hierarchy of "focus traversal cycles", as defined below. The focusable components that make up the hierarchy may be, but need not be, members of a component hierarchy descending from a single top-level window. Each focus traversal cycle is rooted at a "focus cycle root" and has an associated "focus traversal policy" that specifies precisely how focus traverses through the cycle. In addition, the hierarchical model incorporates the concepts of "up-cycle" and "down-cycle" traversal to allow a user to enter and leave focus traversal cycles in a well-defined fashion. In the model, these new traversal concepts are elevated to the same order as ordinary forward and backward traversal. The model allows the application developer to define focus traversal in a component-specific fashion, as explained in greater detail below.

A "focus traversal cycle" in accordance with the invention is defined as a subset of the focusable components of an application in which normal focus traversal "forward" or "backward" will traverse through all of the components in the focus cycle, but no other components. Thus, this cycle is a mapping from an arbitrary component in the cycle to its "next" (forward traversal) and "previous" (backward traversal) components.

A "focus cycle root" in accordance with the invention is defined as a component that is in two focus traversal cycles. Typically, one cycle will comprise a container and its descendants, while the other will comprise the container and its siblings within its parent. When the focus owner is a component inside a particular cycle, normal forward and backward focus traversal cannot move the focus owner out of the focus cycle. Similarly, normal forward and backward focus traversal cannot move the focus owner to a different focus cycle. Instead, two additional traversal operations, "up-cycle" and "down-cycle", are defined to allow keyboard and programmatic navigation up and down the focus traversal cycle hierarchy.

Every top-level window is, by definition, a focus cycle root. Thus, if the developer has defined no other focus cycle root, then all of the top-level window's focusable descendants will be in its focus cycle. The default focus traversal policy of the focus cycle root will ensure that all focusable descendants will be reached during normal forward or backward traversal. If, on the other hand, the top-level window has descendants that also have been defined as focus cycle roots, then each such descendant is a member of two focus cycles; the one that it is a root of, and the one of its nearest focus cycle root ancestor. Thus, in order to traverse the focusable components belonging to the focus cycle of such a "descendant" focus cycle root, one first traverses (forward or backward) to reach the appropriate descendant, and then uses the "down-cycle" operation to reach the descendant's focus traversal cycle. The initial focused component within the descendant's focus traversal cycle may be set according to the developer's wishes. The other components of the descendant focus cycle root may then be reached using normal forward and backward traversal.

Figure 8:
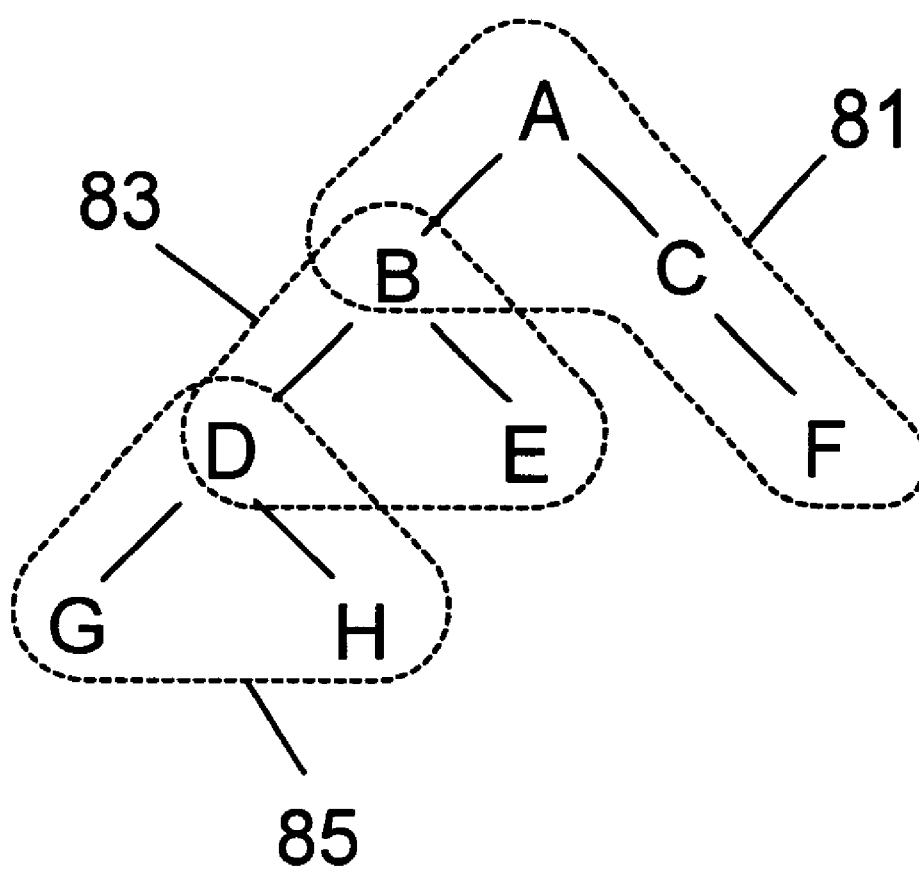
FIG. 8 illustrates a hierarchical model for expressing focus traversal in accordance with one embodiment of the invention.

An example hierarchy in accordance with one embodiment of the invention is illustrated in FIG. 8. In this example, it is assumed that A is a top-level window, which means that it must be a focus cycle root. B and D are containers that are also focus cycle roots. C is a container which, in this example, is not a focus cycle root. G, H, E, and F are all "leaf" components. Thus, there are a total of three focus cycle roots in this example, and accordingly there are three focus traversal cycles. The first, focus traversal cycle 81, has A as its root. A, B, C, and F are members of focus traversal cycle 81. The second, focus traversal cycle 83, has B as its root; B, D, and E are members of this focus traversal cycle. The third focus traversal cycle, cycle 85, has D as its root. D, G, and H are members of cycle 85.

The model hierarchy of the invention also introduces the concept of "current focus cycle root." This concept flows from recognition of the fact that if the focus owner is itself a focus cycle root, it may be ambiguous which components represent the "next" and "previous" components during normal forward or backward traversal. For example, if B in the example of FIG. 8 is the focus owner, a forward focus traversal request would be ambiguous because it would be unclear whether to move focus to the "next" component of focus traversal cycle 81, or to the "next" component of focus traversal cycle 83. Accordingly, the model hierarchy of the invention maintains knowledge of the current focus cycle root and uses it to differentiate between the two possibilities.

Embodiments of the invention also specify a "focus traversal policy". Every focus cycle root has an associated focus traversal policy which may be set by the developer. If not set specifically, the focus traversal policy is inherited recursively from its focus cycle root ancestor. If no ancestor has a focus traversal policy set explicitly, the focus traversal policy is ultimately inherited from an application default. The focus traversal policy defines the following six components:

1. Given a focus cycle root and a component 'x' in that cycle, the next component after 'x'.
2. Given a focus cycle root and a component 'x' in that cycle, the previous component before 'x'.
3. Given a focus cycle root, the "first" component in that cycle. The "first" component will be the component to focus when traversal "wraps" in the forward direction.
4. Given a focus cycle root, the "last" component in that cycle. The "last" component will be the component to focus when traversal "wraps" in the reverse direction.
5. Given a focus cycle root, the "default" component in that cycle. The "default" component will be the first to receive focus when traversing down into a new focus traversal cycle. The default component may be the same as the "first" component, but need not be.
6. Given a top-level window, the "initial" component in that window. The initial component will be the first to receive focus when the window is first made visible. By default, this is the same as the "default" component, but may be set to a different component by the developer.

As mentioned previously, focus traversal in accordance with the invention is component-specific. Each component typically will define the following four keys: a forward traversal key, a backward traversal key, an up-cycle traversal key, and a down-cycle traversal key. The TAB and SHIFT-TAB keys are the normal defaults for the forward and backward traversal keys, respectively. However, in certain components such as text areas, the developer may want the user to be able to enter the TAB character as text. Therefore, for these components, alternative forward and backward traversal keys would be defined (e.g., CTRL-TAB, CTRL-SHIFT-TAB). Similarly, the up-cycle and down-cycle traversal keys can be defined in accordance with the developer's wishes, such as ALT-UP ARROW and ALT-DOWN ARROW.

In an application generated by a developer in accordance with the present invention, when a given component is the focus owner and a user presses one of the traversal keys, the keystroke will automatically initiate a focus traversal operation. If the traversal key indicates forward or backward traversal, the focus traversal operation will be performed in accordance with the focus traversal policy installed on the current focus cycle root. If the traversal key indicates up-cycle or down-cycle traversal, traversal will occur in accordance with the definitions below. Although this discussion refers to "keys" because use of a keyboard is the most common means of focus traversal, it will be understood that such usage is intended to be generic to alternative types of input devices, such as special input devices designed for disabled users or TV remote controls.

"Up-cycle traversal" is defined in accordance with the invention to be a focus traversal operation that changes the current focus cycle root to its focus cycle root ancestor. The focus owner is then set to the current focus owner's focus cycle root, and the current focus cycle root is set to the new focus owner's focus cycle root. If, however, the current focus owner's focus cycle root is a top-level window, then the focus owner is set to the focus cycle root's "default" component, and the current focus cycle root is unchanged. Similarly, "down-cycle traversal" is defined in accordance with the invention as a focus traversal operation that moves the focus down one focus traversal cycle. If the current focus owner is a focus cycle root, then the current focus cycle root is set to the current focus owner and the focus owner is set to the current focus owner's "default" component. If the current focus owner is not a focus cycle root, then no focus traversal operation occurs.

As described in detail above, the invention provides an elegant solution to the issue of focus traversal. In particular, embodiments of the invention establish a hierarchical model for expressing focus traversal. The model of the invention employs a hierarchy of focus traversal cycles each rooted at a focus cycle root, although certain advantages of the invention may be obtained even when the invention is applied to a single transversal cycle. Each focus traversal cycle has a focus traversal policy associated with it that precisely specifies how focus traverses through the cycle. Further, the concept of "up-cycle" and "down-cycle" traversal allow traversal up and down the cycle hierarchy. A developer using a toolkit incorporating the hierarchical model of the invention is advantageously able, in a straight-forward and elegant manner, to establish and define logical focus traversal protocols in GUIs without necessitating the generation of custom code.

Figure 2:
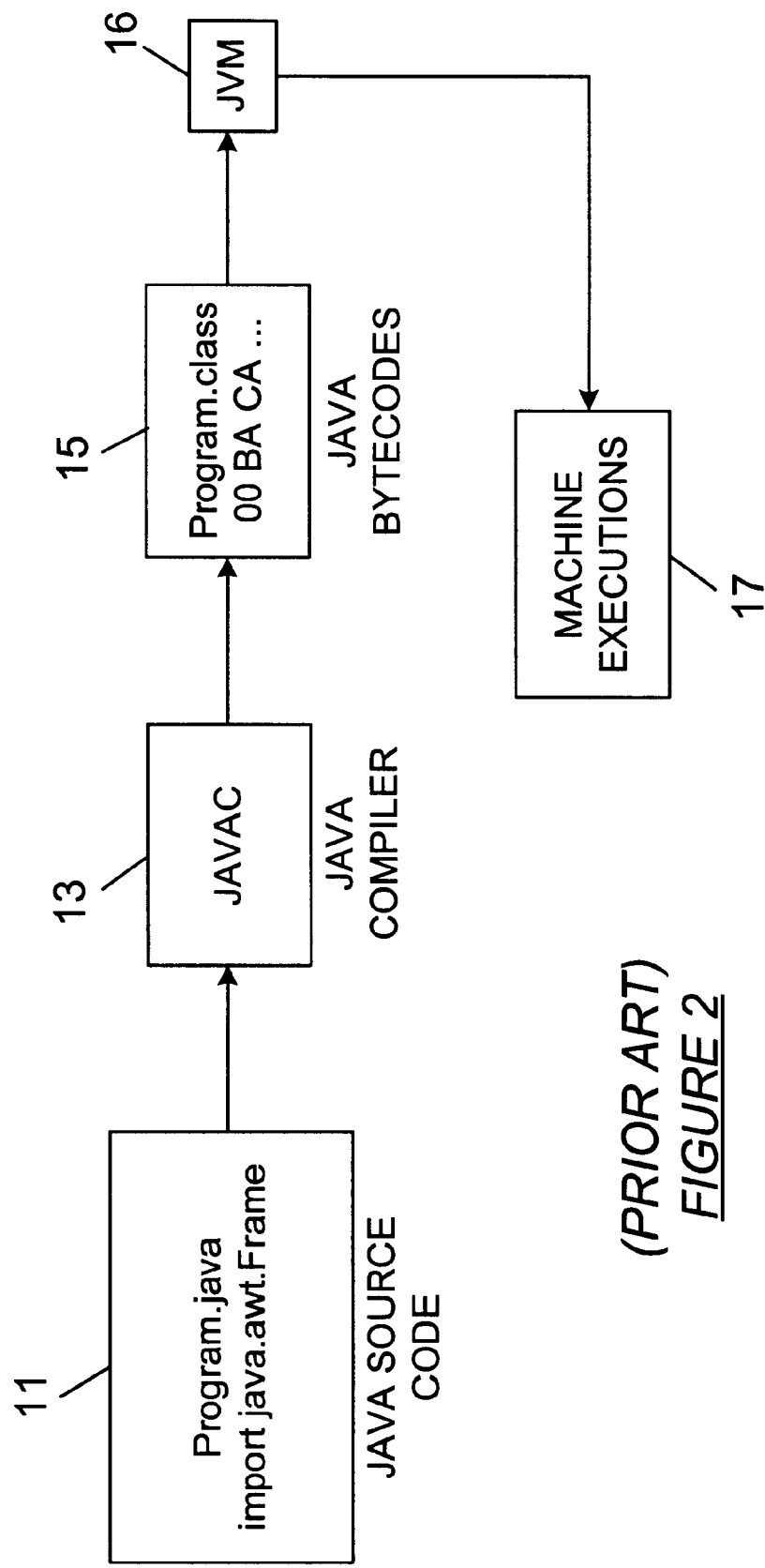
FIG. 2 illustrates a mechanism for creating Java™ applications.
Figure 3:
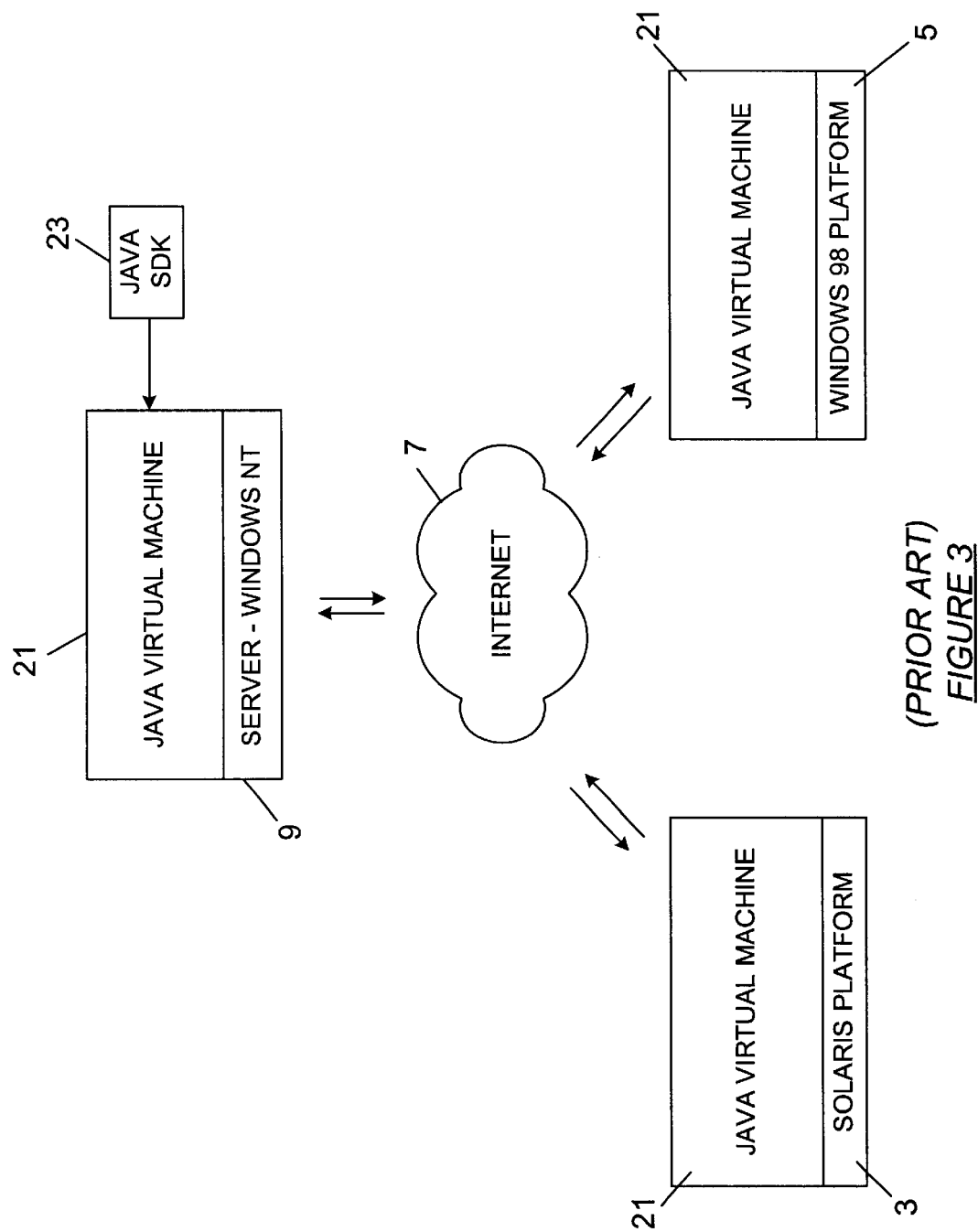
FIG. 3 illustrates a Java™ application running in a multiple platform environment.

A toolkit in accordance with the invention may, for example, comprise a collection of functional tools for the developer each implemented in the Java™ programming language as shown in FIG. 2 and suitable for execution on a computer such as that shown in FIG. 6. As a result of the method and toolkit of the invention, the process of application development may be enhanced. This is particularly advantageous in situations where the user will not be using a mouse. One such situation is an accessible environment where the user's primary selection mechanism is focus traversal, i.e., the user is unable to use a pointing device such as a mouse. In this situation the user must rely on focus traversal using the keyboard or an alternative input means to change focus.

While various embodiments of the invention have been shown and described in detail above, the invention is not limited thereto. Particularly, the invention is not limited to incorporation in the AWT package or indeed to the Java™ programming language at all, but rather is applicable to the design of GUI toolkits in any language. Accordingly, the scope of the invention shall not be limited to the specific embodiments discussed, but rather will be defined solely by the scope of the claims that follow.

What is claimed is:

1. A method of establishing a focus traversal protocol in a graphical user interface having a plurality of components within at least one top-level window, the method comprising:

defining the top-level window as a first focus cycle root;

assigning a plurality of components to a first focus traversal cycle associated with the first focus cycle root;

for each component in the first focus traversal cycle, establishing a focus traversal key definition including a forward traversal key and a backward traversal key; and establishing a first focus traversal policy associated with the first focus traversal cycle.

2. The method of claim 1, wherein the first focus traversal policy defines, for a given component "x" in the first focus traversal cycle, a next component after component "x" and a previous component before component "x" in the first focus traversal cycle.

3. The method of claim 2, wherein the first focus traversal policy further defines a first component of the first focus traversal cycle to become focus owner when traversal wraps in a first direction and defines a last component of the first focus traversal cycle to become focus owner when traversal wraps in a second direction.

4. The method of claim 3, wherein the first focus traversal policy further defines a default component to become focus owner upon traversal into the first focus traversal cycle.

5. The method of claim 4, wherein the first focus traversal policy further defines an initial component to become focus owner when the top-level window is first made visible.

6. The method of claim 3, wherein the first focus traversal policy further defines an initial component to become focus owner when the top-level window is first made visible.

7. The method of claim 2, wherein the first focus traversal policy further defines a default component to become focus owner upon traversal into the first focus traversal cycle.

8. The method of claim 7, wherein the first focus traversal policy further defines an initial component to become focus owner when the top-level window is first made visible.

9. The method of claim 2, wherein the first focus traversal policy further defines an initial component to become focus owner when the top-level window is first made visible.

10. The method of claim 1, wherein the first focus traversal policy defines a first component of the first focus traversal cycle to become focus owner when traversal wraps in a first direction and defines a last component of the first focus traversal cycle to become focus owner when traversal wraps in a second direction.

11. The method of claim 10, wherein the first focus traversal policy further defines a default component to become focus owner upon traversal into the first focus traversal cycle.

12. The method of claim 11, wherein the first focus traversal policy further defines an initial component to become focus owner when the top-level window is first made visible.

13. The method of claim 10, wherein the first focus traversal policy further defines an initial component to become focus owner when the top-level window is first made visible.

14. The method of claim 1, wherein the first focus traversal policy defines a default component to become focus owner upon traversal into the first focus traversal cycle.

15. The method of claim 14, wherein the first focus traversal policy further defines an initial component to become focus owner when the top-level window is first made visible.

16. The method of claim 1, wherein the first focus traversal policy defines an initial component to become focus owner when the top-level window is first made visible.

17. The method of claim 1, wherein the focus traversal key definition of at least one of the components further includes an up-cycle traversal key.

18. The method of claim 1, wherein the focus traversal key definition of at least one of the components further includes a down-cycle traversal key.

19. The method of claim 1, further comprising defining one of the plurality of components of the first focus traversal cycle as a second focus cycle root;

assigning a plurality of components to a second focus traversal cycle associated with the second focus cycle root;

for each component in the second focus traversal cycle, establishing a focus traversal key definition including a forward traversal key and a backward traversal key; and establishing a second focus traversal policy associated with the second focus traversal cycle.

20. The method of claim 19, wherein the focus traversal key definition of at least one of the components further includes an up-cycle traversal key.

21. The method of claim 20, wherein the focus traversal key definition for said one of the plurality of components further includes a down-cycle traversal key.

22. The method of claim 19, wherein the focus traversal key definition for said one of the plurality of components further includes a down-cycle traversal key.

23. The method of claim 1, wherein the focus traversal key definition is implemented for use with a special input device.

24. A windowing toolkit for use by a developer in establishing a focus traversal protocol for a graphical user interface having a plurality of components within at least one top-level window, said windowing toolkit having a plurality of windowing tools each having codes suitable to be executed by a computer the toolkit comprising:

a first tool configured to assign a plurality of components to a first focus traversal cycle associated with a first focus cycle root, the first focus cycle root being defined as a top-level window;

a second tool configured to assign a focus traversal key definition to each component in the first focus traversal cycle, the focus traversal key definition including a forward traversal key and a backward traversal key; and a third tool configured to establish a first focus traversal policy associated with the first focus traversal cycle.

25. The toolkit of claim 24, wherein:

the first tool is further configured to define one of the plurality of components of the first focus traversal cycle as a second focus cycle root and to assign a plurality of components to a second focus traversal cycle associated with the second focus cycle root;

the second tool is further configured to assign a focus traversal key definition to each component in the second focus traversal cycle, the focus traversal key definition including a forward traversal key and a backward traversal key; and the third tool is further configured to establish a second focus traversal policy associated with the second focus traversal cycle.

26. The toolkit of claim 25, wherein the focus traversal key definition of at least of the components further includes an up-cycle traversal key.

27. The toolkit of claim 26, wherein the focus traversal key definition for said one of the plurality of components further includes a down-cycle traversal key.

28. The toolkit of claim 25, wherein the focus traversal key definition for said one of the plurality of components further includes a down-cycle traversal key.

29. The toolkit of claim 24, wherein the focus traversal key definition of at least of the components further includes an up-cycle traversal key.

30. The toolkit of claim 24, wherein the second tool is configured to assign the focus traversal key definitions for use with a special input device.

* * * * *